(No Model.)
W. H. MITCHELL.
WIRE FENCE.
No. 401,450. Patented Apr. 16, 1889.
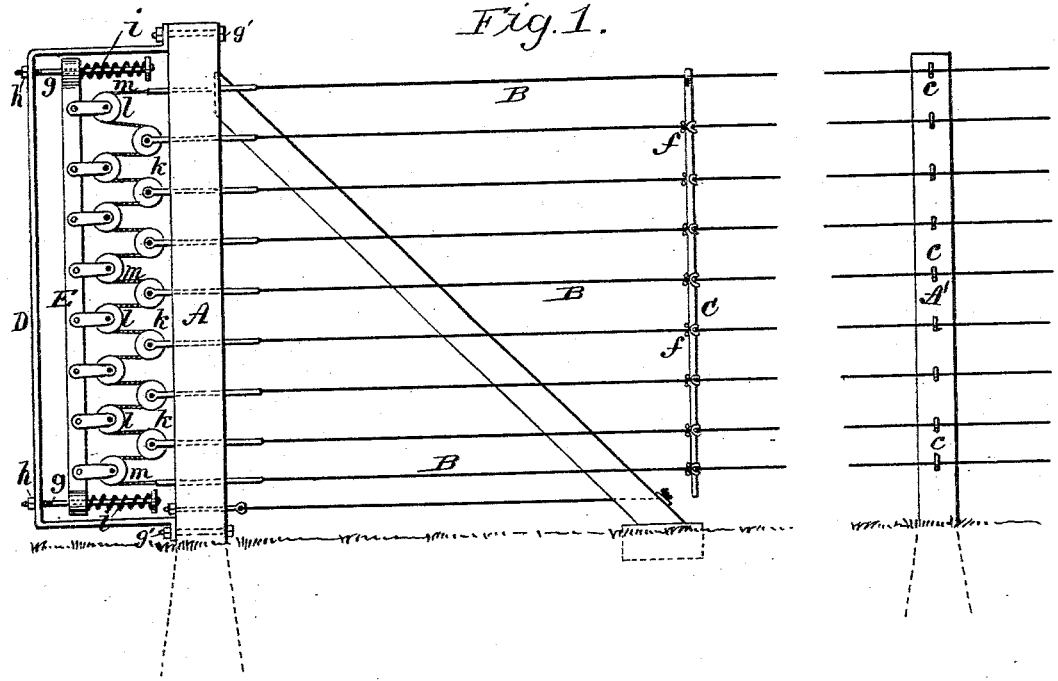
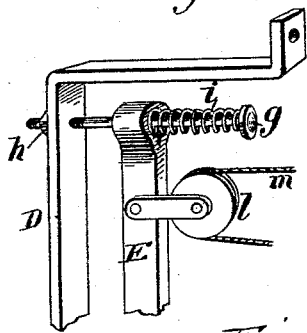
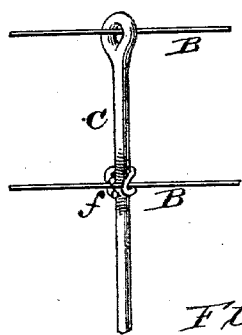
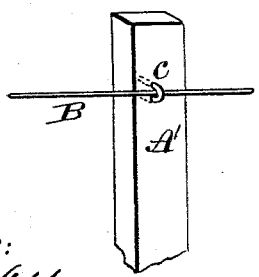
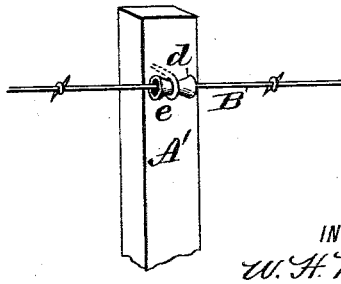
WITNESSES:
J. D. Garfield
C. Sedgwick
INVENTOR:
W. H. Mitchell
BY Munn & Co.
ATTORNEYS.
N. PETERS, Photo-Lithographer, Washington, D. C.

UNITED STATES PATENT OFFICE.

WILLIAM H. MITCHELL, OF HORSE CAVE, KENTUCKY.

WIRE FENCE.

SPECIFICATION forming part of Letters Patent No. 401,450, dated April 16, 1889.

Application filed September 29, 1888. Serial No. 286,767. (No model.)

*To all whom it may concern:*

Be it known that I, WILLIAM H. MITCHELL, of Horse Cave, in the county of Hart and State of Kentucky, have invented a new and useful Improvement in Wire Fences, of which the following is a full, clear, and exact description.

This invention relates to self-tightening wire fences; and it consists in certain novel constructions and combinations of parts, substantially as hereinafter described, and pointed out in the claim, and whereby the several wires of the fence are kept at the same tension, and any strain thrown upon a single wire is distributed between all the wires, thereby preventing breakage; also whereby the wires will be kept tight in both hot and cold weather and the tension on them may be adjusted as desired.

Reference is to be had to the accompanying drawings, forming a part of this specification, in which similar letters of reference indicate corresponding parts in all the figures.

Figure 1 represents a side elevation of a broken section of wire fence in part embodying my invention. Fig. 2 is a perspective view, upon a larger scale, of certain means in part used for effecting and distributing the tension on the wires; Fig. 3, a perspective view of an iron upright in part used between the posts of the fence and means for connecting it with the fence-wires; Fig. 4, a view in perspective of one of said means or clamps; and Figs. 5 and 6, perspective views of a portion of the posts, with attached devices for freely carrying the wires, both when the latter are plain and of a barbed construction.

A A' indicate two of the fence-posts, which I prefer to arrange at a distance of about twenty feet apart. The post marked A is the outer or end one of the fence or fence-section.

The wires B B of the fence are carried in a free or longitudinally-sliding manner by the posts. Thus when the wires are smooth or plain ones they are held to the intermediate posts, A', by simple staples $c$, as shown in Figs. 1 and 5, said staples not being driven too tight to prevent the wires from slipping through them; but when the wires are of a barbed construction, as shown in Fig. 6, they are attached to said posts in a longitudinally free or sliding manner by means of double-funnel-shaped thimbles $d$, secured to the posts by staples $e$.

Between the several posts—preferably at a distance of about four feet apart—are iron uprights C, one of which only is here shown. These uprights, unlike the posts, do not enter the ground, but simply connect, as cross-ties, the several lengths or tiers of wires B B with each other. Each of these uprights C, which may be of round bar-iron, is constructed with an eye at top, through which the upper wire runs, and is bent or indented to fit the other wires and connected to each of the latter by wire-clamps $f$. (See more particularly Figs. 3 and 4.)

Bolted, as at $g'$ $g'$, to the outside of the outer or end post, A, is a bent flat-bar open casing, D, extending the height of the post, or thereabout, and presenting the flat side of the bar to the post, and within this casing, between it and the post, is another upright flat bar, E, arranged edgewise to the post. This inner bar, E, is connected with the outer bar or casing, D, by bolts $g$, having nuts $h$ and springs $i$ arranged around the bolts, and serving by their tension to force the bar E outward—that is, toward the upright portion of the outer bar or casing, D—the bar E being free to slide on said bolts.

Attached to the ends of the wires B B, or fittings thereon supported in a longitudinally-sliding manner by the post A, are a series of pulleys or sheaves, $k$ $k$, and attached to the bar E, in horizontally-intermediate relation with said sheaves, are other sheaves or pulleys, $l$ $l$. Around these several sheaves or pulleys $k$ and $l$ is laced or run a wire or other rope, $m$, or its equivalent, a chain connected at its one end to the upper wire, B, of the fence and at its other end with the bottom wire, B, thereof. In this manner or by these means each wire B is kept at the same tension, and any strain on the one wire will be distributed between all the wires, thereby preventing breakage, while the springs applied to the bolts which connect the inner bar with the outer bar at the end of the fence serve to keep the several wires tight, both in cold and hot weather, and by the adjustment of the nuts on said bolts the tension may be regulated as desired. Both ends of the fence or fence-section, if desired, may be similarly constructed and provided with strain-distributing and tension devices, as described.

Having thus described my invention, what I claim as new, and desire to secure by Letters Patent, is—

In a wire fence, the combination, with the fence-post A and wires B B, of the outer fixed bar or casing, D, the loose bar E, arranged between said post and said outer bar, adjustable spring-tension devices applied to said bars D and E, the sheaves or pulleys $k$ $l$, connected, respectively, with the bar E and ends of the wires B B, and the flexible connection or rope $m$, arranged to pass around said pulleys and connected at its ends with the upper and lower wires of the fence, substantially as and for the purposes specified.

WILLIAM H. MITCHELL.

Witnesses:
JOSEPH S. SMITH,
CHARLIE C. MUSTAIN.